Figure 1:
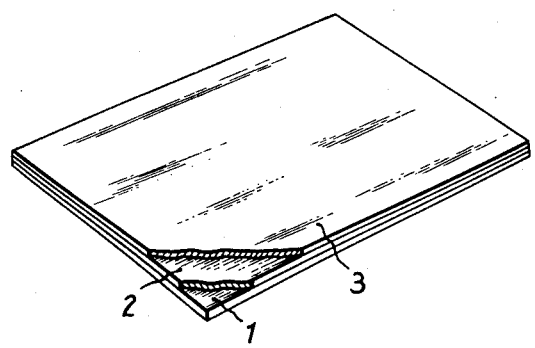

Feb. 4, 1941.

HARTMUT ISRAEL KALLMANN, FORMERLY
KNOWN AS HARTMUT KALLMANN, ET AL 2,230,618

METHOD FOR THE INVESTIGATION OF SUBSTANCES WITH THE AID OF SLOW NEUTRONS

Filed Jan. 20, 1939

Inventors:
Hartmut Israel Kallmann,
Ernst Kuhn,
By Potter, Pierce & Scheffler,
Attorneys.

Patented Feb. 4, 1941

2,230,618

UNITED STATES PATENT OFFICE 2,230,618

METHOD FOR THE INVESTIGATION OF SUBSTANCES WITH THE AID OF SLOW NEUTRONS

Hartmut Israel Kallmann, formerly known as Hartmut Kallmann, Berlin - Charlottenburg, and Ernst Kühn, Berlin, Germany, assignors to I. G. Farbenindustrie Aktiengesellschaft, Frankfort-on-the-Main, Germany Application January 20, 1939, Serial No. 252,048
In Germany January 21, 1938

3 Claims. (Cl. 250—65)

This invention relates to means for investigating materials by means of slowly moving neutrons, and is directed particularly to means for producing a photographic image of a beam of neutrons which has passed through the material undergoing investigation.

Slowly moving neutrons are only very little absorbed by lead, but are strongly absorbed by substances containing hydrogen, as is the case, for instance, with wood. They behave, therefore, in this respect directly reversely to X-rays. If thus, slowly moving neutrons are projected through a body composed of substances of various kinds, the distribution of the intensity of the neutron beam leaving that body differs from the distribution of the intensity of a beam of X-rays projected through said body. If one succeeds in obtaining a photographic image of the distribution of the intensity over a neutron beam, there is obtained by the projection of slowly moving neutrons through the said body, an image which differs from that which is obtained by X-rays passed through the body.

This investigation method is important not only for medical purposes, but also for technical investigations. It is, for instance, possible to investigate bodies situated within metallic vessels. As the neutrons are absorbed, or scattered respectively, not only by solid bodies, but also by liquid or gaseous ones, the neutrons can be utilised also for the investigation of liquid and gaseous substances.

It has already been suggested for the purpose of producing an image of the distribution of the intensity, by means of a photographic system, over a neutron beam which has been passed through the body to choose a reaction in which heavy charged particles are produced which blacken the photographic system materially stronger than the neutrons do without an intermediate reaction. It has, furthermore, been proposed for this purpose to provide the plates, or the films respectively, also with a foil containing lithium (as disclosed and claimed in our co-pending application Serial No. 197,929) now Patent No. 2,186,757. A plate or film bearing such a foil must be used however with a possibly perfect exclusion of air, but this requirement renders the practical employment of such plates or films difficult.

It is an object of the present invention to overcome the above-mentioned difficulty. Another object of the invention is the provision of a relatively air-insensitive device for obtaining a photographic image of the distribution of the intensity of a beam of neutrons after passage of such beam through a material undergoing investigation.

These, and other, inventive objects are attained by a device consisting essentially of a photographic plate (or photographic film) adjacent one side of which is located a layer of boron (or a layer of a compound of boron). When a beam of neutrons is passed through a material to be investigated and thereafter is impinged upon the boron-containing layer of the combination, there takes place in said layer a reaction similar to the reaction taking place in a lithium foil; the neutrons impinging upon the boron produce heavy charged particles which blacken the adjacent portions of the sensitive photographic layer, whereby to form therein a photographic image of the distribution of intensity of the neutrons not absorbed by the investigated material.

In order to increase the effect, plates or films with two of said added boron-containing layers may be used, or a plurality of plates or films may be arranged behind one another and a layer comprising boron, or a layer containing a boron compound, can be provided between the sensitive photographic layers of the plates or films.

The device of the present invention will now be described in further detail with reference to the accompanying drawing in which—

Figure 2:
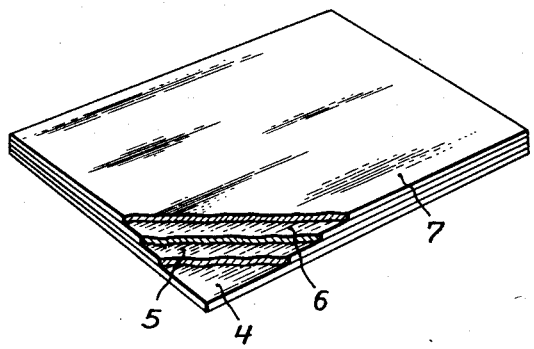

Fig. 1 is a perspective view of a combination of a photographic plate with a boron-containing layer, parts being broken away to show the layers, and Fig. 2 is a similar view of a modification of the device illustrated in Fig. 1.

In Fig. 1, the numeral 1 designates a support for a photographic layer 2, and 3 is a coating layer, of a composition comprising boron, located on the side of the photographic layer 2 remote from support 1.

In Fig. 2, 4 designates a support (e. g., a glass plate), 5 designates a layer of boron-containing composition, 6 designates a photographic layer, and 7 designates an outer layer of boron-containing composition.

In using either of these combinations, a beam of neutrons is caused to traverse the material undergoing examination and thereafter to impinge upon the layer of boron-containing composition (i. e., upon layer 3 of Fig. 1, or upon layer 7 of Fig. 2), causing emission of heavy charged particles from portions of the boron-containing layer which latter in turn act upon the adjacent photographic layer 2 (or 6).

This invention includes subject matter in common with our application Serial No. 197,928, filed March 24, 1938, entitled "Method of and implement for investigation substances with the aid of slowly moving neutrons" (now Patent No. 2,188,115), which latter discloses the use of a boron layer for neutron detection.

We claim:

1. A device for producing a photographic image of the distribution of the intensity of a neutron beam comprising a photographic layer, a support for the photographic layer, and, on the side of the latter remote from said support, a layer comprising boron.

2. A device as specified in claim 1, in which the photographic layer is overlaid with a layer of a compound of boron.

3. A device as defined in claim 1, in which a layer of a composition containing boron is interposed between the support and the photographic layer.

HARTMUT ISRAEL KALLMANN, FORMERLY KNOWN AS HARTMUT KALLMANN.
ERNST KÜHN.